March 6, 1951 — C. H. NICKELL — 2,544,278
TAIL WHEEL ASSEMBLY
Filed April 15, 1946 — 4 Sheets-Sheet 1
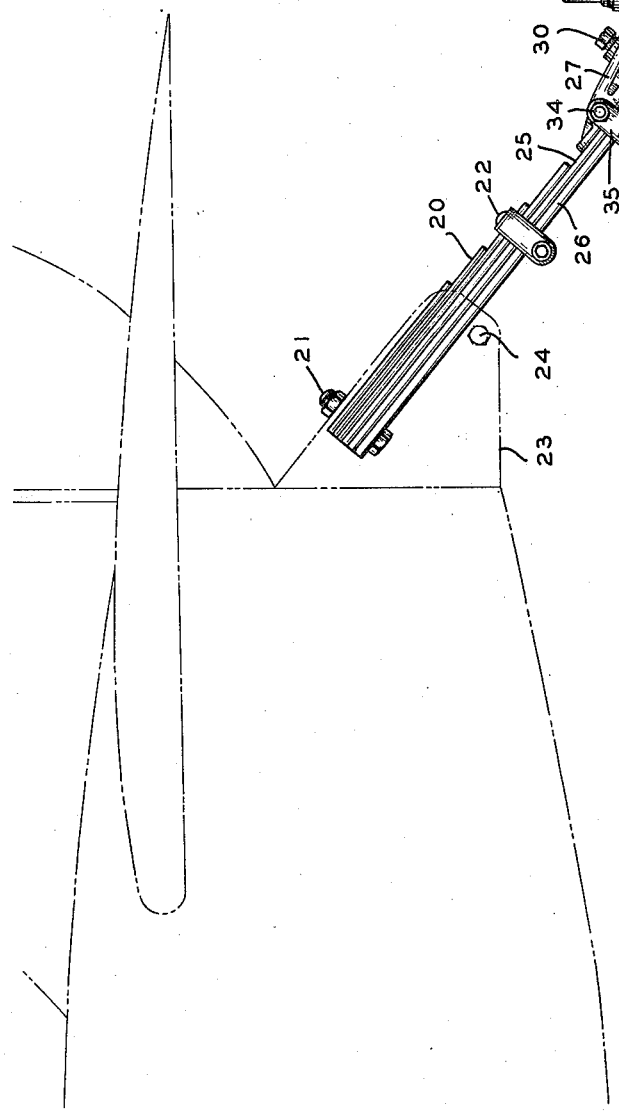
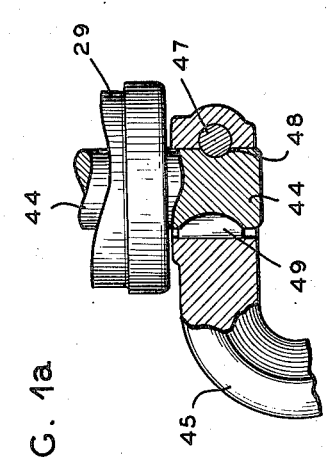
INVENTOR.
CLAUDE H. NICKELL
BY A. Yates Dowell
ATTORNEY

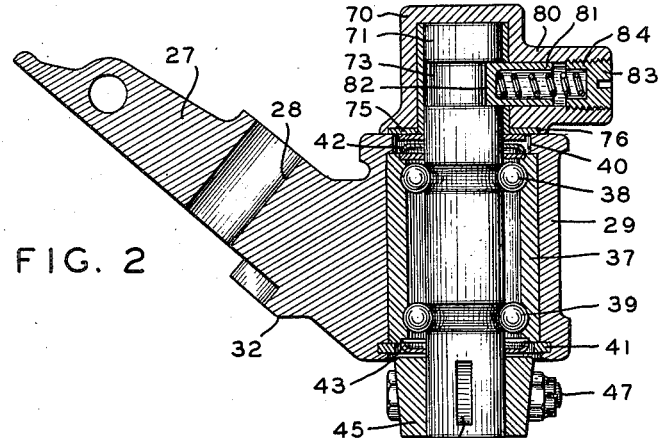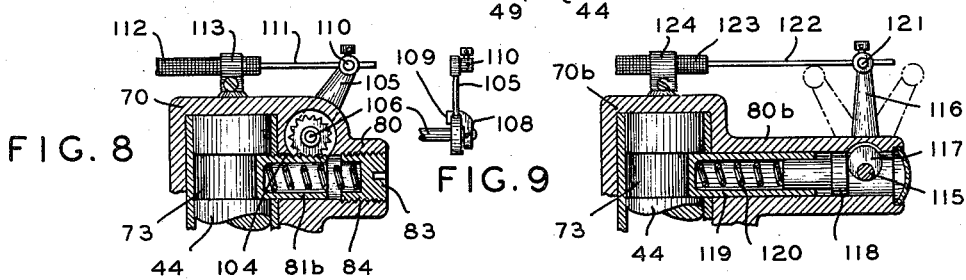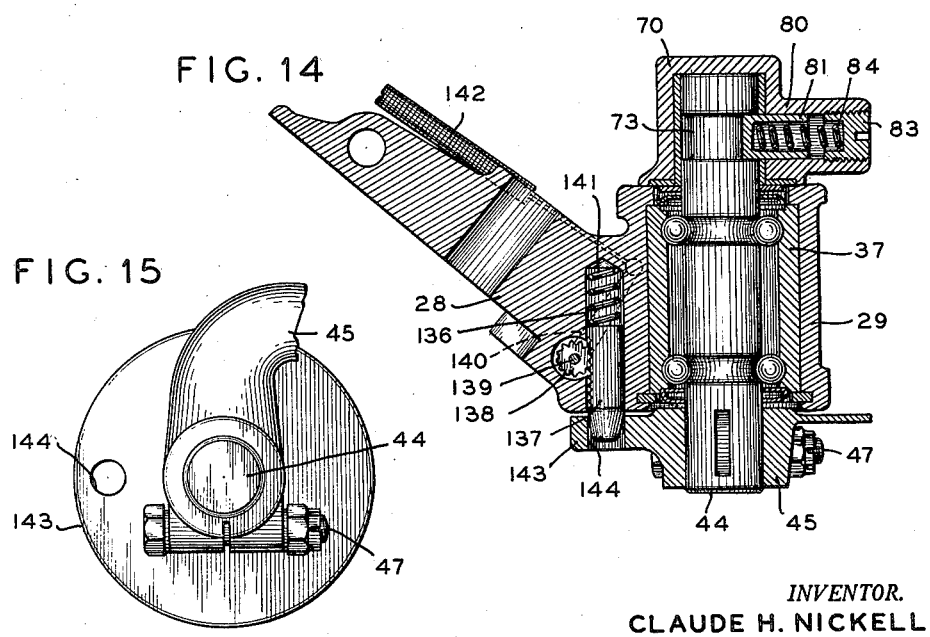

March 6, 1951 C. H. NICKELL 2,544,278
TAIL WHEEL ASSEMBLY
Filed April 15, 1946 4 Sheets-Sheet 3
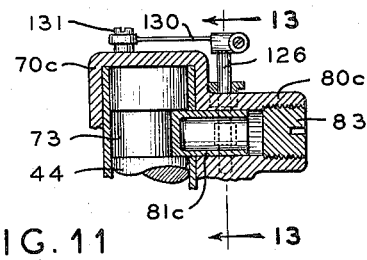
FIG. 11
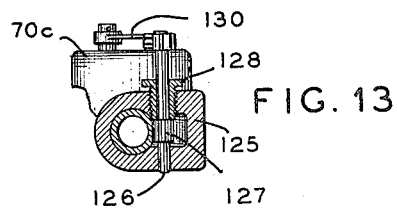
FIG. 13
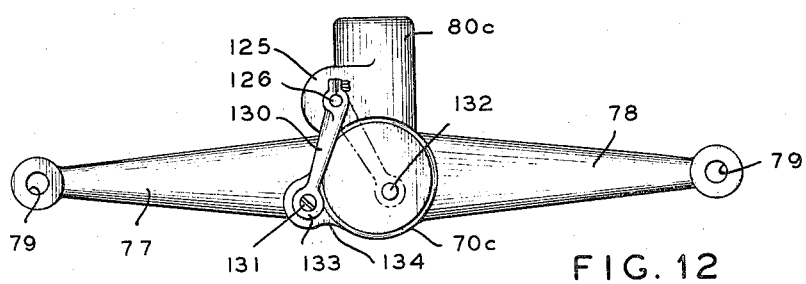
FIG. 12
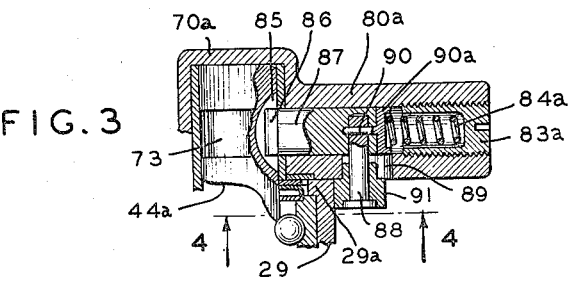
FIG. 3
FIG. 4
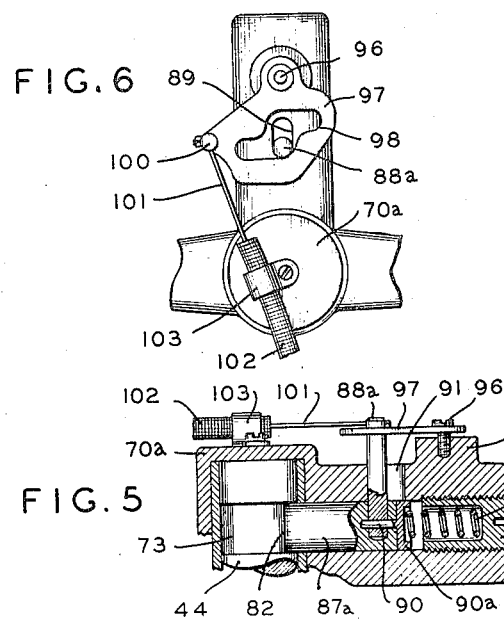
FIG. 6
FIG. 5
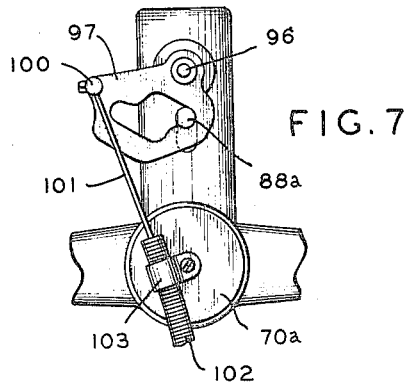
FIG. 7
*INVENTOR.*
CLAUDE H. NICKELL
BY A. Yates Dowell
ATTORNEY March 6, 1951 C. H. NICKELL 2,544,278
TAIL WHEEL ASSEMBLY
Filed April 15, 1946 4 Sheets-Sheet 4

*INVENTOR.*
CLAUDE H. NICKELL
BY *AYates Dowell*
ATTORNEY

Patented Mar. 6, 1951

2,544,278

UNITED STATES PATENT OFFICE 2,544,278

TAIL WHEEL ASSEMBLY

Claude H. Nickell, New Castle, Ind.

Application April 15, 1946, Serial No. 662,251

21 Claims. (Cl. 244—109)

This invention relates to improvements in tail wheel assemblies for aircraft and particularly to an improved tail wheel assembly of the steerable type.

Various assemblies have been previously proposed but have been subject to various defects and difficulties, such as failures due to breakage, particularly of the resilient supporting means, lubrication and service defects and a limited selectability of steering and locking conditions. Such previously proposed tail wheel assemblies have also experienced considerable difficulty with the resilient tire equipment, particularly where solid or non-pneumatic tires are used, resulting in the tires becoming unevenly and unduly worn and becoming loose on the wheel, in which condition they are subject not only to rapid deterioration but present a definite hazard in that they may be displaced from the wheels under unfavorable landing conditions.

In many cases also in addition to the danger of breakage, unfavorable operating conditions or operation by inexperienced personnel has resulted in the assembly being forced permanently out of line, resulting in unfavorable aerodynamic conditions which affect the flight of the airplane.

It is among the objects of the present invention to provide an improved tail wheel assembly that is not likely to be broken or forced out of alignment, even under unfavorable operating conditions or when used by inexperienced flight personnel, one in which the wheel is steerable by operation of the airplane rudder and has additional freedom of steering movement under conditions in which its angular movement exceeds that of the rudder and in which the tires are so constructed and secured to the wheel that they will not become loosened or damaged.

It is also an object of this invention to provide an improved tail wheel assembly so constructed that very little servicing is required and in which those parts which may require occasional service are so constructed and assembled as to be readily accessible whereby servicing is facilitated to the extent that the mechanism is easily maintained in proper mechanical condition.

A still further object resides in the provision of an improved steerable tail wheel assembly wherein the tail wheel may be steered by the operation of the airplane rudder and is resiliently centered, wherein the tail wheel may be released for free swivelling action without connection to the airplane rudder controls and may also, if desired, be positively locked against all swivelling action, while leaving the rudder free to move under control of the operator.

An additional object resides in the provision of an improved tail wheel assembly having a non-pneumatic tire construction in which the resilient material of the tire is supported by and is secured to the wheel by rigid metallic members which not only maintain the tire in a condition of perfect concentricity with the wheel but also support it in such a manner that it remains truly annular or circular and has no tendency toward uneven wear or roughness in operation.

An additional object resides in the provision of an improved tail wheel assembly wherein the various parts are firmly held in proper operative position, and relative movement of any kind between relatively fixed parts is effectively prevented, thus reducing wear and breakage to the assembly.

Other objects and advantages will become apparent to those skilled in the art upon a consideration of the following description in connection with the accompanying drawings and the appended claims.

In the drawings:

Figure 1 is a side elevational view of a tail wheel assembly illustrative of the invention, a fragmentary portion of an airplane being shown in broken lines to indicate the assembled relationship between the tail wheel assembly and the airplane;

Figure 1a is a sectional view of a fragmentary portion of the bracket and steering post;

Figure 16:
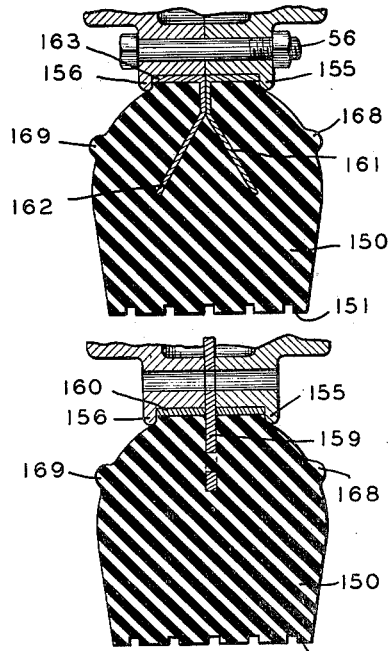
Figure 19:
Figure 18:
Figure 17:
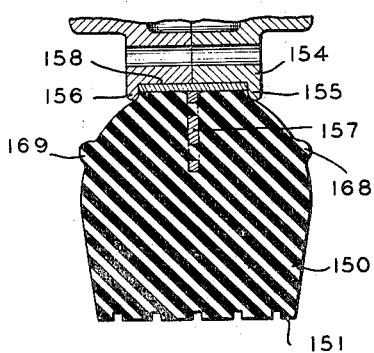

Figure 2, a longitudinal sectional view on a somewhat enlarged scale of the bracket and steering post unit of the assembly shown in Figure 1;

Figure 3, a sectional view similar to Figure 2 showing a modified form of the invention providing locking means in addition to those shown in Figure 2;

Figure 4, a transverse sectional view taken on the line 4—4 of Figure 3 looking in the direction of the arrows;

Figure 5, a sectional view similar to Figure 3 showing a still further modified locking arrangement;

Figure 6, a top plan view of the modified unit shown in Figure 5 with the cam plate in position to provide steering and swivelling beyond the steering range;

Figure 7, a view similar to Figure 6 showing the cam plate in free swivelling position;

Figure 8, a view similar to Figure 2 showing a still further modified locking arrangement;

Figure 9, a side elevational view of a fragmentary portion of the modified unit shown in Figure 8;

Figure 10, a sectional view similar to Figure 2 showing a still further modified form of locking mechanism;

Figure 11, a sectional view similar to Figure 2 showing a further modified form of locking mechanism;

Figure 12, a top plan view of the modification shown in Figure 11;

Figure 13, a transverse sectional view on the line 13—13 of Figure 11;

Figure 14, a sectional view similar to Figure 2 showing a further modified form of locking mechanism;

Figure 15, a bottom plan view of the modification shown in Figure 14;

Figure 16, a vertical sectional view on the line 16—16 of Figure 1, particularly showing an improved non-resilient tire construction for the tail wheel;

Figure 17, a transverse sectional view of a modified tire construction;

Figure 18, a transverse sectional view of a further modified tire construction; and Figure 19, a transverse sectional view of a still further modified tire construction.

With continued reference to the drawings and particularly to Figure 1, the tail wheel is shown connected to the airplane by a spring arm 20, comprising a plurality of leaf springs of different length held together in operative association by a suitable end bolt 21 and a spring clip 22.

It is to be understood, however, that the tail wheel may be secured to the airplane by any other suitable resilient means which may, if desired, include a pneumatic shock damper and that the supporting means may be arranged to retract the tail wheel into the fuselage if that should be desired.

The arrangement shown is particularly adaptable for use on small or light aircraft and has been selected for the purpose of disclosing the invention as such a construction is particularly simple and easy to illustrate.

In the illustrative arrangement, the leaf spring 20 is secured to a bracket or casting 23 by means of the end bolt 21 and a cross bolt 24 which extends through the casting below the spring at a location spaced from the bolt 21. The casting 23 may be a standard or conventional part rigidly secured to a structural element of the airplane fuselage.

The spring illustrated has a main leaf 25 upon the upper side of which are a plurality of shorter leaves of different lengths, four such leaves being shown in the spring illustrated, and below the main leaf 25 is an auxiliary leaf 26 somewhat longer than the longest leaf above the main leaf.

A bracket 27 has a somewhat triangular flanged portion 28 and a cylindrical shaft supporting portion 29. The portion 28 is provided with an under surface which fits upon the upper surface of spring leaf 25 and is of a length to overlap the end portion of auxiliary lower spring leaf 26. A bolt 30 extends through a suitable boss in the bracket portion 28 and through the spring leaf 25 and is provided with a nut 31 to firmly attach the bracket to the spring leaf. A projection 32 on the under surface of the bracket portion 28 has its surface facing the end of the spring machined to an arc, the center of which is coincident with the axis of bolt 30 and the end of the main spring leaf 25 has an arcuate shape that exactly fits the curvature of the contacting face of extension 32. This construction relieves the bolt of a considerable amount of sheer stress which would ordinarily be imposed upon it and also assists in maintaining the bracket in true alignment with the longitudinal center line of the spring. While the arcuate shape is preferred other shapes, such as a triangular indentation, may be used if desired.

A clip 33 secures the end of the bracket portion 28 opposite the shaft support 29 to the spring. This clip may conveniently comprise a bolt 34 passing through apertures in the end portions of link members, one of which is indicated at 35, and through an aperture in the bracket, and a similar bolt 36 passing through the link members and through a sleeve or spacer immediately below and in contact with the under surface of the auxiliary spring leaf 26.

This arrangement not only maintains the bracket in true alignment with the spring as explained above, but also relieves the spring of concentrated stresses incident to tail wheel movements of unusual magnitude. For example, if the airplane were being moved backwardly, a severe stress concentration would be imposed on the spring leaf 25 if the bolt 30 alone were depended upon to secure the bracket to the spring. The clip 33 relieves the spring of this stress concentration and materially reduces spring breakage under varying operating conditions by dividing the load between the main spring leaf 25 and the auxiliary leaf 26. This is of material advantage, particularly in cold weather operation, under which conditions the spring leaves and the attaching bolt have a tendency to snap at stress concentrations below those at which failure would occur during operation at normal temperatures. Even in normal operation the clip 33 imparts a part of the load on the spring to the lower leaf 26 and the main spring 25 is relieved of a sufficient amount of the load so that breakage of the spring under normal operation is practically eliminated.

Referring to Figure 2 the cylindrical bracket portion 29 contains a sleeve member 37 of hardened steel which provides a race for the spaced rows of bearing balls 38 and 39. This sleeve member is secured in the bracket by an internal flange 40 at the upper end of the bracket providing a stop for the upper end of the sleeve and a snap ring 41 fitted in an internal groove in the lower end of the bracket portion 29 and bearing against the lower end of the sleeve. Grease seals 42 and 43 are provided between the sleeve 37 and the steering post 44 outside of the ball bearings and the post is held against longitudinal movement relative to the sleeve by the ball bearings.

The post extends beyond the bracket portion 29 at each end thereof and has secured on its lower end an arm 45 which connects the post with the tail wheel axle 46.

This arm 45 corresponds to one half of the usual fork used to mount the tail wheel and has sufficient strength and rigidity to support the wheel in proper operative position without the necessity of using a complete fork. The arm is secured on the lower end of the steering post by a suitable arrangement such as by providing on the arm an integral split collar having apertured ears or lugs drawn together by a clamp bolt 47 to contract the collar about the shaft. The bolt fits into a milled groove or slot 48, Fig. 1a, provided in the end portion of the shaft and this arrangement prevents accidental displacement of the arms from the shaft even though the bolt should become loosened. Relative rotation between the arm and the shaft is prevented by suitable anti-rotational means, such as the woodruff key 49 fitted into corresponding slots provided in the post and the arm.

The opposite end of the arm is secured to the wheel axle 46 by similar means including the clamp bolt 50. In this case, however, the key may be omitted since the cooperation between the clamp bolt and the notch 51, Fig. 16, milled in the side 43 is sufficient to prevent relative rotation between the axle and the arm.

Referring to Fig. 16, the axle 46 is provided with an annular shoulder 52 which positions the arm lengthwise of the axle and the reduced end portion of the shaft extending through the arm is of sufficient length to adequately support all of the loads placed on the axle by the landing wheel 53.

The wheel itself comprises two similar parts 54 and 55 secured together by annularly spaced bolts 56 to constitute the rim portion of the wheel. These parts are preferably magnesium castings, although other materials and methods of manufacture may be employed without exceeding the scope of the invention. The two parts 54 and 55 when secured together provide a cylindrical hub portion 57 and an annular integral tire receiving rim or felloe 58 joined to the hub portion by an annular web portion 59 provided with apertures for the bolts 56. Preferably the two portions of the wheel are identical in construction to reduce manufacturing costs and facilitate servicing of the unit.

The cylindrical hub portion is provided at each end with an inwardly directed flange, as indicated at 60 and 61, and these flanges abut the ends of a sleeve member 62 which closely fits spaced annular surfaces provided in the end portion of the hub. The space within the hub between these sleeve supporting portions may be made of larger diameter in order to reduce the total weight of the assembly. The sleeve 62 is formed of hard steel to provide a race for the spaced ball bearings 63 and 64, the inner races of which are provided by grooves formed directly in the axle 46. This bearing is packed at assembly and the lubricant is retained in the bearing by suitable grease seals 65 and 66 so that lubrication during use is not necessary. The end of the hub opposite the arm 45 is closed by a suitable expansion type plug 67 pressed into the end of the hub. A suitable non-pneumatic tire 68 is carried on the rim or felloe portion 58.

A generally cylindrical cup shaped cap 70, Fig. 2 is fitted over the upper end of the post 44 which projects above the bracket portion 29. This portion of the post is provided with spaced annular bearing portions 71 and 72 separated by an annular groove or recess 73. A bearing bushing 74 preferably of "Oilite" or some similar material is fitted in the cap 70 and contacts the bearing portions of the post. A pair of non-metallic washers 75 and 76 are disposed between the adjacent ends of the bracket portion 29 and the cap 70 to provide a grease seal. The cup may be packed with lubricant at assembly and will not ordinarily require further lubrication for the lifetime of the unit.

Referring back to Fig. 16, a pair of laterally extending steering arms 77 and 78 are formed on or rigidly secured to the cap 70 and are provided at their outer ends with suitable apertures 79, Fig. 12, for the connection thereto of corresponding ends of steering cables, the opposite ends of which are connected to the ships rudder bar in conventional manner. These cables conventionally include tensioning means such as coiled extension springs which maintain the cables in proper tension for manual steering of the tail wheel.

A hollow cylindrical boss 80 is formed on one side of the cap 70 and is provided with a cylindrical bore disposed substantially at right angles to the axis of the steering post 44. A hollow cylindrical plunger 81 having a flat closed end is slidably mounted in the bore of the boss 80 and extends into the annular groove 73 of the steering post. Within the groove 73, the steering post is provided with a flattened portion 82 which faces the flat end of the plunger 81 whenever the tail wheel is within that range of swiveling movement, the limits of which are determined by the range of the manual rudder control.

The outer end of the bore of the boss 80 is screw threaded and receives a screw threaded closure member or plug 83 and between this plug and the closed end of the plunger there is disposed a coiled compression spring 84 which resiliently forces the plunger toward the steering post.

The space between the adjacent ends of the plunger 81 and the plug 83 when the plug is in properly adjusted position is such as to permit the plunger to move from the flattened portion to the round portion of the recess 73 but to prevent its movement entirely out of the recess. By this arrangement the plunger retains the cap 70 in operative position on the steering post and the cap may be removed by removing the plug 83, the spring 84 and the plunger 81. If desired the screw threads in the bore of the boss 80 may be extended so that the plug 83 may be screwed in to abut the adjacent end of the plunger 81 and hold the plunger rigidly in contact with the flattened portion of the post 44. This adjustment is desirable under certain operating conditions where it is not desired to permit swiveling of the tail wheel beyond the rudder control range of movement. Also, if it is desired to permit free swiveling of the tail wheel without rudder control for certain operating conditions, the spring 84 may be removed and the plug 83 reinserted to a position at which the plunger is not forced against the flat portion of the shaft but is maintained in the annular recess to hold the cap on the steering post.

The purpose of providing for the possibility of swiveling action beyond the range of rudder control is to accommodate the assembly to certain operating conditions under which the steering wheel may turn to a position at right angles to the longitudinal axis of the aircraft or may even swivel around to a position at the opposite side of its usual operative position. This may occur if the aircraft is turned sharply about one of its landing wheels in taxiing or if the tail is moved sideways or the airplane is towed rearwardly during handling of the aircraft while on the ground.

In the modified arrangement shown in Figs. 3 and 4, the boss 80a is somewhat elongated to provide space for a pin and roller which extends downwardly from the boss outside of the bracket portion 29. In this arrangement the post 44a does not have a flattened portion within the annular groove 73 but instead has a longitudinal slot 85 which receives a key or tang 86 on the end of a plunger 87 which is slidable in the bore of the boss 80a. A coiled compression spring 84a bears against the outer end of this plunger and against a closure plug 83a threaded into the open end of the boss. Adjacent its end opposite the tang the plunger 87 is provided with a transverse aperture which receives the end portion of a pin 88 which extends downwardly through a slot 89 in the lower end of the boss to a position opposite the upper end portion of the bracket part 29. This pin is provided in the aperture in plunger 87 with a transverse aperture and the plunger is provided with a coaxial well or bore which provides a continuation on each side of the pin aperture and a pin 90 is inserted in this well and through the pin 88 to hold the pin 88 in the plunger 85. The pin 90 has a flat head portion 90a interposed between the end of plunger 87 and the spring 84a so that the pin 90 is positively retained in operative position but may be quickly removed upon removal of the plug 83a and the spring 84a to free the pin 88 from the plunger. By this arrangement the entire subassembly can be quickly assembled and disassembled.

On its lower end the pin 88 carries a roller 91 and between the upper end of this roller and the plunger 85 there is disposed a spacer 92 which rides in the slot 89 and serves as a stop to limit the travel of the plunger 87 in both directions.

The upper end portion of the bracket part 29 is shaped to provide a cam element 93 particularly shown in Fig. 4. This cam element comprises a flattened area on the upper flange 29a of the bracket portion 29 at its ends into the circular circumference of the remainder of the flange. The difference in radius between the center part of the flattened portion and the remainder of the flange is that required to withdraw the tang on the plunger 87 from the seat or slot 85 in the post 44a but not sufficient to move the end of the plunger entirely out of the annular recess 73.

With this construction the cap 70a is positively locked to the steering post 44a for all movements within the operative range of the manual rudder control as distinguished from the resilient locking means described above and illustrated in Fig. 2. When the end of the range of manual rudder control is reached, if there is sufficient force tending to swivel the wheel to a greater extent, the roller 91 rides up on the corresponding flange 29a and moves the plunger 87 backwardly against the force of spring 84a withdrawing the tang of the plunger from the slot in the steering post and thereafter permitting free swiveling action of the tail wheel.

In the modified arrangement shown in Figs. 5, 6, and 7 the construction is generally similar to that shown in Fig. 3 except that the cam on the bracket is omitted, and the plunger moving pin extends from the plunger upwardly through the top of the boss and the roller 91 is omitted. The plunger is also preferably similar to the plunger 87 of Fig. 2 having a flat end portion which bears against a flattened portion 82 in the recess portion 23 of the steering post 44, although the use of a plunger similar to the plunger 87 of Fig. 3 and a corresponding slot in the steering post is within the scope of the invention.

The boss has an extension 95 which provides a support for a pivot pin 96 upon which is pivoted a cam plate 97 having a cam slot 98 through which the plunger moving pin 88a extends. The cam plate is provided with a lever arm to the outer end of which is secured a connection 100 for the core member 101 of a Bowden cable 102 anchored in the cap 70a by a suitable clip 103. Operation of the Bowden cable will swing the cam plate 97 about the pivot pin 96. The Bowden cable is also anchored to the rearward part of the airplane and extends forwardly to a suitable anchorage in a position convenient to the operator of the aircraft.

The cam slot 98 is so shaped that in one operative position of the cam plate the plunger 87a is positively locked in engagement with the flattened portion of the steering post to prevent relative rotation of the cap and post and thereby limit the swivelling range of the tail wheel to the rudder control range. In an intermediate position the pin is released for sliding movement of the plunger so that the tail wheel is steered by the rudder control within the rudder control range but may be turned beyond this range upon the application of sufficient swivelling from and in the third position the plunger is locked in its retracted position to permit free swivelling of the tail wheel relative to the rudder control steering cap 70a. The intermediate position of the cam plate is particularly illustrated in Fig. 6 and the free swivelling position is shown in Fig. 7.

In all positions of the cam plate the plunger remains in the recess 73 to hold the steering cup on the steering post.

In the modification shown in Fig. 8, the steering post 44, cap 70, plug 63 and spring 84 are the same as illustrated in Fig. 2 and described above. The plunger 81b is the same as the plunger 81 of Fig. 2 except that a series of rack teeth 104 are provided in the outer surface of the plunger. The plunger is so located in the boss 80 that these teeth occupy a position at the top of the boss. A lever 105 is mounted on a pin or shaft 106 journalled in suitable apertures in the cap 70 immediately above the boss 80. The shaft is freely rotatable relative to the lever. A pinion 107 fixed on the shaft meshes with the rack teeth provided in the plunger 104 and an operating lever 108, Fig. 9, also fixed on the shaft has a tongue or projection 109 which overlies the upper side of the lever 105 so that movement of this lever about the shaft 106 is effective to retract the plunger 81b, but the plunger may be moved backwardly by the post 44 without moving the lever. The intermeshing teeth on the plunger and pinion hold the plunger against rotation in the boss.

A connection 110 is provided on the outer end of the lever for the core member 111 of a Bowden cable 112, one end of which is anchored to the cap 70 by a suitable clip 113. This cable is also secured to the rearmost portion of the airplane and extends to the operator's compartment in the manner described above in connection with Figs. 5, 6 and 7.

With this modified arrangement, when the lever 105 is in the operative position illustrated in Fig. 8, the plunger 81b bears against the flattened portion of the steering post 44 within the annular recess 73 so that the post is turned when the manual rudder control is operated. If the steering wheel is forced to swivel beyond the range of the manual rudder control, the plunger will be forced backwardly against the force of spring 84 to permit the post to turn in the cap 70. When the Bowden cable is operated to pull the lever 105 forwardly, or to the left as viewed in Fig. 8, the plunger is retracted by the pinion 107 and the post then turns freely in the cap, thereby providing free swivelling of the tail wheel.

In the modified form shown in Fig. 10, the steering post 44 is the same as that illustrated in Fig. 2 and described above and has an annular recess 73 provided at one side with a flattened portion. The cap 70b is somewhat modified, however, in that the boss c is elongated and is provided near its outer end with diametrically opposed apertured bosses in which a shaft or pin 115 is journalled. A cam lever 116 is mounted on the pin 115 and has, within the bore of the boss 80c, a cam portion 117, a part of which is eccentric relative to the axis of the pin 115 and another part of which may be substantially concentric relative to the pin axis. A cylindrical abutment member 118 has a flat head portion bearing against the side of cam 117 and a reduced shank portion projecting into a hollow plunger 119 having a flat closed end portion in contact with the steering post 44 within the annular recess 73. A coil compression spring 120 is disposed within the plunger 119 between the closed end of the plunger and the adjacent end of the abutment member 118.

The lever 116 is provided at its outer end with a connection 121 for the core member 122 of a Bowden cable 123 which is anchored to the top of the cap 70b by a suitable clip 124, the cable being also secured to the airplane in the manner indicated above in connection with Fig. 5.

The lever 116 has three operative positions as indicated in full and dotted lines in Fig. 10, which positions would also be suitably indicated at the control knob of the Bowden cable in the pilot's compartment of the aircraft. When the lever is in the intermediate position, as indicated in full lines in Fig. 10, the plunger 119 is held against the steering post by the force of the spring 120, the steering post will be caused to turn with the cap 70b under manual rudder control and may turn relative to the cap when forced to swivel beyond the range of the manual rudder control. When the lever is in its forward or left hand operating position, as indicated by dotted lines in Fig. 10, the head of the abutment member 118 is forced into solid contact with the adjacent end of the hollow plunger 119 and is held in that position by the locking portion of the cam 117 which is preferably substantially concentric with the axis of pin 115. When the lever is in this position the steering post is positively held against rotation relative to the cap 70b and cannot swivel beyond the manual rudder control range. When the lever is in its rearward or right hand operating position, as indicated in broken lines in Fig. 10, the abutment member 118 is permitted to move outwardly to an extent such that compression of the spring 120 is relieved and the steering post may then rotate freely in the cap 70b permitting free swivelling of the tail wheel substantially free of the manual rudder control. In all operative positions of the lever 116 the plunger is held in the annular recess 73 of the steering post so that the cap 70b is retained on the post and can be removed only by intentional withdrawal of the plunger and its associated mechanism.

In the modified form shown in Figs. 11, 12 and 13, the arrangement is similar in principle to that shown in Fig. 8 except that a somewhat different mechanical construction is provided and the manual control is dispensed with. In this form the cap 70c is substantially the same as that shown in Fig. 2 and described above, except that the boss 80c is provided at one side thereof with an extension 125, particularly shown in Fig. 13, which constitutes a housing and journal support for a shaft 126 and shaft carried pinion 127. The plunger 81c is of the same construction as that illustrated in Fig. 10 and described above, except that it is rotated through 90° to bring the rack teeth to the side of the plunger where they mesh with the teeth of pinion 127. The steering post 44 is the same as that illustrated in Fig. 2 and described above, and the plunger extends into the annular recess 73 and has a flat end which bears against a flattened portion of the steering post within the recess in the manner described above. The compression spring shown in the previous modifications is omitted and the closure plug 83 has only the functions of excluding dirt and moisture from the mechanism and providing a stop so that the plunger cannot move entirely out of the annular recess 73. A screw plug 128 is provided in one side of the extension 125 in order that the opening in the extension may be sufficiently large to insert the pinion 127 therethrough and this screw plug provides one of the journals for the shaft 126.

A lever 130 is secured at one end to the upper end of the shaft and has its opposite end provided with an aperture for the reception of a safety or locking screw 131 which may be threaded into either one of two screw threaded openings 132 and 133 provided in the upper part of the cap 70c. In some cases it will be necessary to provide a lateral extension 134 on the cap to carry one of the screw apertures.

The lever 130 has two operative positions corresponding to the apertures 132 and 133. When the end of the lever is secured by the screw in the aperture 132 the plunger 81c is held in retracted position so that the steering post may rotate freely in the cap 70c and is not subject to manual rudder control. When the lever is in the alternative operative position in which it is secured by the screw 131 in aperture 133, the plunger is held firmly against the flat portion of the steering post and the steering post is thereby locked to the cap so that no free movement of the tail wheel independently of the manual rudder control is permitted.

In the modified form shown in Fig. 14, the cap is still held on by stopscrew and plunger in annular recess the cap 70 and cap carried plunger mechanism may be similar to that shown and described in any of the above modifications from Fig. 2 to Fig. 13, the form shown in Fig. 2 being shown for the purpose of simplifying the illustration, although if the modified form shown in Figs. 11, 12 and 13 were used, it would be desirable to safety the lever 130 in plunger retracting position. The steering post 44 is the same as that illustrated in Fig. 2 and described above, but the bracket portion 28 is provided with a well or bore 136 opening to the bottom of the bracket and having its center line substantially parallel to the axis of the rudder post 44 and positioned adjacent to the bearing sleeve 37. Within this aperture 136 is a slidable pin 137 having rack teeth along one side thereof which mesh with the teeth of a pinion 138 mounted on a shaft 139 journalled in the bracket and projecting beyond the bracket at one side thereof to receive a lever 140. A compression spring 141 is disposed between the top of the plunger and the closed upper end of the well 136 to normally urge the plunger downwardly. A Bowden cable 142 is operatively connected to the lever 140 to swing the lever and thereby move the plunger 137 up and down between its two operative positions.

The tail wheel supporting arm 45 is provided with an extension in the form of an annular flange 143 in which is provided an aperture 144 for the reception of the lower end of plunger 137 when the tail wheel is in a position in which it is in alignment with the center line of the spring 20. The aperture 144 and the lower end of plunger 137 are preferably correspondingly tapered to facilitate entry of the plunger into the aperture and eliminate any excess clearance between these parts.

With this arrangement when the tail wheel is in the aligned position indicated, the Bowden cable may be operated to lower the plunger 137 and engage its lower end in the aperture in flange 143, thereby positively locking the wheel supporting arm to the bracket and preventing rotation of the steering post in the supporting bracket.

It is desirable to have the tail wheel locked against swivelling action under certain operating conditions as when the airplane is on the ground and may be subjected to a cross wind, when it is being towed by dolly under the tail wheel or even in some cases where it is necessary to make a cross wind landing or take-off with the airplane.

The above constructions provide a tail wheel arrangement in which the tail wheel may be swivelled by the manual rudder control and may automatically release from this control for swivelling beyond the range of the manual rudder control when subjected to swivelling forces of sufficient magnitude, the tail wheel may be locked to the manual rudder control so that swivelling of the wheel beyond the range of the manual control is prevented, may be entirely freed from the manual rudder control for free swivelling action and may be locked against any swivelling action.

The improved tire construction is particularly illustrated in Figs. 16 to 19, inclusive.

At the present time a large number of aircraft and particularly those of a single engine size use a non-pneumatic or solid tail wheel tire. These tires have generally been secured to the tail wheel by having projections or lugs around the circumference of the opening which lugs fit into recesses in the wheel and are clamped or compressed therein when the two parts of the wheel are brought together by the wheel bolts. This method of attachment places an outwardly directed stress on the tire and as the tire is used, the material tends to expand to some degree and is also subject to some expansion and contraction effects due to temperature changes. The lugs may be dislodged from the recesses in the wheel by these changes and also be inertia induced distortions of the tire at landing impact, particularly on hard-surfaced runways. The result is that the tire, in a comparatively short period of use, becomes loose on the wheel and there is danger of its being rolled off the wheel in landing, take-off or taxiing of the airplane and presenting an operational hazard. Such tires frequently become skewed or out of round with respect to the wheel on which they are mounted and have a tendency to set up severe vibrational effects when they are run on the ground and also to occasion unfavorable aerodynamic conditions when the craft is airborne.

The improved tire construction shown in Figs. 16 to 19, inclusive, provides a tire which is rigidly held in permanent concentricity with the axis of the wheel which cannot become loose on the wheel, and also cannot be skewed or rolled by side thrust during operation.

In the form shown in Fig. 16, a tire body 150 is formed of suitable resilient material such as natural or synthetic rubber and preferably has its resiliency controlled to fall within desired limits. This body has an annular substantially cylindrical outer surface provided with a suitable tread 151 and a rounded inner portion, the cross section of which is preferably contoured to a substantially circular arc. An annular plate 152 has its outer portion embedded in the inner portion of the tire body and its inner portion projecting inwardly of the tire body. When the tire is manufactured the plate 152 is properly centered in the tire mold and the unvulcanized rubber forced into the mold and around the outer portion of the plate. This outer portion of the plate included in the tire body is preferably provided with a large number of apertures 153 through which the rubber may extend. When the tire is vulcanized the plate is firmly vulcanized to the rubber and is thus permanently fixed in the tire body.

The plate 152 is in the form of an apertured metal disc and is preferably formed of a relatively hard tempered material, such as heat treated steel. In the arrangement shown in Fig. 16 the aperture in the plate 152 is of a size to closely fit the exterior of the bearing sleeve 62 to positively center the plate relative to the axis of the axle 46. When the plate extends between the wheel parts 54 and 55, it is provided with properly spaced apertures for the bolts 56 which also act to firmly clamp the plate between the two parts of the wheel. Preferably the plate apertures are slightly larger than the bolts to allow for any manufacturing tolerances in the wheel and still permit positive centering of the plate on the bearing sleeve. These bolts function not only to clamp the tire supported plate firmly in place but also to transmit the torque loads from the tire body to the wheel so that there will be no tendency for the tire to rotate relative to the wheel, particularly when rotation of the wheel is suddenly initiated as the tire comes in contact with the ground on landing.

In the form shown in Fig. 16, the wheel is provided with a comparatively wide annular concave rim 58 which also assists in supporting the tire against lateral thrust and radial load. However, with the improved tire construction this wide and relatively heavy rim formation is not absolutely essential and an entirely satisfactory wheel of much lighter weight can be provided by reducing the extent of this tire supporting rim as is shown in the modification illustrated in Fig. 17.

In this arrangement the wheel rim 154 is provided in the form of an annular member having a substantially cylindrical outer surface with a flange or bead 155 at one side thereof and a similar bead 156 at the opposite side. In the arrangement shown in Fig. 17, the tire supporting plate 157 has a larger central opening than the plate 152 of Fig. 16 and fits upon the outer surface of a metal band 158 which fits about the inner circumference of the tire body. The plate 157 is preferably located at substantially the middle of the width of the band 158 and welded to the outer surface of the band.

The band 158 fits tightly about the cylindrical surface of the wheel rim 154 and the two parts of the wheel are preferably provided with sufficient draft to the outer cylindrical surfaces so that as the parts are pulled together by the through bolts, the tire band 158 will fit snugly upon the wheel. The band 158 is secured to the wheel against relative rotation by having its edge portions clamped between the beads 155 and 156 when the two parts of the wheel are drawn together.

In the modified form shown in Fig. 18 the plate 159 does not terminate at the band 160 but extends inwardly of the wheel through the rim portion and may, if desired, be centered on the bearing sleeve in the manner indicated in Fig. 15. The bolts which hold the two wheel parts together extend through apertures in the plate and clamp the plate firmly in position in the wheel and also transmit torque loads from the tire body through the plate to the wheel. In this case the band 160 is made in two parts disposed one at each side of the plate 159 and may be welded to the plate if desired. The welding may be omitted, however, to facilitate placing the metal reinforcing members in the tire mold and the vulcanizing of the rubber tire body to the members depended upon to retain the members in operative relationship. In this form the band is clamped between the rim beads 155 and 156 in the manner described above in connection with Fig. 17 and the construction is generally similar to that described in connection with Fig. 17 except that the plate is extended inwardly of and is secured in the wheel structure.

In the modified form shown in Fig. 19, the reinforcing member, instead of being made in a single plate as hereinabove described, is formed in two similar parts as indicated at 161 and 162. These members lie together at the inner portion of the tire body and then diverge to provide a member of V-shaped cross section. The two members may be extended through the wheel as shown in Fig. 18 or may terminate at the band 163 and may, if desired, be welded to the outer surface of the band. This construction has particular advantage in resisting side thrust loads on the tire and also provides a construction of somewhat greater flexibility than the single plate construction hereinabove described.

In order to improve the appearance of the wheel, decrease its aerodynamic resistance and prevent accumulation of foreign matter in the wheel parts, a pair of plates or shields 164 and 165 may be secured to the wheel structure. In the arrangement illustrated each plate is a concavo-convex sheet metal member of circular shape, the plate 164 being apertured to pass over the end portion of the axle 46. Each plate is provided around its periphery with an inturned bead or flange to increase its stiffness and is also provided on the inner side thereof with an attaching member adapted to engage the corresponding end portions of the wheel hub and secure the plates to the wheel, the attaching member for the plate 164 being indicated at 166 and that for the plate 165 being indicated at 167. Each attaching member may conveniently comprise a cylindrical sheet metal member having at one end an outwardly turned flange secured to the corresponding shield by suitable means such as brazing or soldering and having spaced slots extending from the open end thereof to provide a series of spring fingers each of which has a rib or bead thereon engageable with an annular groove formed in the exterior surface of the wheel hub. The shield member 164 may also have an inturned flange around its central aperture, which flange closely fits the adjacent portion of the axle to exclude foreign material from the interior of the hub.

In the form of wheel shown in Fig. 16 the peripheral flanges of the shield members fit over the edges of the wheel rim. Where a different type of rim is used, as shown in Figs. 17, 18 and 19, the tire body may be provided with beads, as indicated at 168 and 169 in Fig. 17 to receive the peripheral flanges of the shield members and provide a support for the members and also a seal to exclude foreign matter from the space between the shields.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A tail wheel assembly for aircraft comprising resilient supporting means; a bracket having a portion arranged for attachment to said supporting means and a cylindrical post receiving portion; a post journalled in said bracket; an arm secured to the lower end of said post; a wheel axle carried by said arm; a wheel journalled on said axle; a steering cap provided with laterally extending arms rotatably mounted on the upper end of said post; means carried by said cap to releasably retain said cap on said post and provide an operative connection between said cap and said post, said means engaging an annular recess in said post and being operative to release said connection to permit free swivelling of said wheel when subjected to forces above a predetermined value and upon further operation thereof to release said cap from said post; and a tire on said wheel.

2. A tail wheel assembly for aircraft comprising resilient supporting means; a bracket having a portion arranged for attachment to said supporting means and a cylindrical post receiving portion; a post journalled in said bracket; an arm secured to the lower end of said post; a wheel axle carried by said arm; a wheel journalled on said axle; a steering cap provided with laterally extending arms rotatably mounted on the upper end of said post; and resilient means carried by said cap to releasably retain said cap on said post and provide a torque transmitting connection between said cap and said post and permit rotation of said post relative to said cap when subjected to forces above a predetermined value; said resilient means comprising a hollow boss on said cap disposed with its longitudinal axis substantially at right angles to the axis of said post, a plunger slidable in said boss and having a flat end portion received in an annular recess in said post and normally engaging a flattened portion of said post within said recess, a removable plug in the outer end of said boss, and a compression spring between said plug and said plunger.

3. A swivelling tail wheel assembly for aircraft comprising a multiple leaf spring adapted to be rigidly secured at one end to an aircraft and having a main leaf with supporting leaves of consecutively decreasing length on the upper side thereof and an auxiliary leaf shorter than said main leaf but longer than any of said supporting leaves on the lower side of said main leaf; a bracket having a steering post receiving portion and a bolting portion connected to the outer end of said spring by a first connection with said main leaf near the end thereof and a second connection with said main leaf and said auxiliary leaf near the end of the auxiliary leaf; a steering post journalled in said bracket; a steering attachment on the upper end of said post and a wheel supporting arm on the lower end of said post.

4. A swivelling tail wheel assembly for aircraft comprising a multiple leaf spring adapted to be connected at one end to an aircraft structural member; a bracket connected to the opposite end of said spring and having a steering post receiving portion; a steering post journalled in said bracket and extending beyond the bracket at each end thereof; a steering attachment releasably secured on the upper end of said post; a wheel carrying member on the lower end of the post, the connection between said spring and said bracket comprising a bolt extending through apertures in said bracket and the main leaf of said spring and a clip secured to said bracket at a point spaced from said bolt and closely embracing two leaves of said spring.

5. A swivelling tail wheel assembly for aircraft comprising a multiple leaf spring adapted to be connected at one end to an aircraft structural member; a bracket connected to the opposite end of said spring and having a steering post receiving portion; a steering post journalled in said bracket and extending beyond the bracket at each end thereof; a steering attachment releasably secured on the upper end of said post; a wheel carrying member on the lower end of the post; the connection between said spring and said bracket comprising a bolt extending through apertures in said bracket and the main leaf of said spring and a clip secured to said bracket at a point spaced from said bolt and closely embracing two leaves of said spring and alignment maintaining means between said spring and said bracket comprising an extension on said bracket having a recessed surface facing the end of the main spring leaf and an end contour on said main leaf closely fitting the recessed surface of said extension.

6. A swivelling tail wheel assembly for aircraft comprising a multiple leaf spring adapted to be connected at one end to an aircraft structural member; a bracket connected to the opposite end of said spring and having a steering post receiving portion; a steering post journalled in said bracket and extending beyond the bracket at each end thereof; a steering attachment releasably secured on the upper end of said post; a wheel carrying member on the lower end of the post, the connection between said spring and said bracket comprising a bolt extending through apertures in said bracket and the main leaf of said spring and a clip secured to said bracket at a point spaced from said bolt and closely embracing two leaves of said spring and alignment maintaining means for said bracket comprising an extension on the lower surface of said bracket having a surface facing the end of the main spring leaf concavely curved on an arc centered on the axis of said bolt and an end surface on said main leaf curved so closely fit the curved surface of said extension.

7. Means for swivelly mounting a tail wheel on an airplane comprising a bracket having a cylindrical portion at one end thereof, a cylindrical sleeve of hardened material secured in said cylindrical bracket portion against longitudinal movement and provided interiorly thereof with grooves to constitute races for bearing balls, a steering post of hardened material extending through said sleeve and provided externally thereof with grooves for the bearing balls, the grooves in the sleeve and the post being spaced apart to provide an antifriction bearing adjacent each end of the sleeve; grease seals between the post and the sleeve at each end of the sleeve and outside of the adjacent bearing whereby the bearing may be prelubricated and retain sufficient lubricant therein for the useful life of the assembly in which it is used, said post having portions extending beyond said sleeve at each end thereof to receive a steering cap on the upper end portion and a wheel supporting arm on the lower end portion thereof.

8. In an aircraft tail wheel assembly; a resiliently mounted bracket having a steering post receiving portion; a sleeve secured in said bracket; a steering post extending through said sleeve; bearing balls between said post and said sleeve and grease seals between said post and said sleeve outside of said bearing balls; a sleeve mounted in said tail wheel against longitudinal displacement; an axle extending through said sleeve; bearing balls between said axle and said sleeve and grease seals between said axle and said sleeve outside of said bearing balls; and an arm connected at one end to one end of said axle and at the opposite end to the lower end of said steering post.

9. In a tail wheel assembly, a resiliently mounted bracket having a steering post receiving portion; a steering post journalled in said bracket and projecting therefrom at each end; an arm secured to the lower end of said post; a wheel axle secured to said arm; a wheel journalled on said axle; a steering cap on the upper end of said post comprising a cup-shaped portion fitting over the end portion of the post and having a bushing of bearing material immediately surrounding the steering post; an elongated hollow boss at one side of said cup shaped portion and a pair of steering arms secured to said cup shaped portion and extending laterally in opposite directions therefrom; said post having an annular recess therein within said cap and a key slot in one side thereof within said recess; a plunger slidably mounted in the bore of said hollow boss and having at one end a key engageable in said key slot; a screw plug in the end of said boss; a compression spring between said screw plug and said plunger; a pin secured to said plunger and projecting downwardly therefrom through a slot in the lower portion of said boss; a cam on the upper end of the post receiving portion of said bracket and a roller on said pin contacting said cam, said cam having a shape such that the key on said plunger engages in the key slot in said post during movements of said cap and post within the range of manual rudder control and is disengaged from said key slot in the event the tail wheel is swivelled beyond the limits of said annual rudder control range.

10. In a tail wheel assembly including a bracket and a steering post journalled in said bracket and projecting therebeyond at its ends; a steering cap on the upper end of said post having an elongated hollow boss at one side thereof and a pair of steering arms extending laterally in opposite directions therefrom, said steering post having an annular recess within said cap and a key slot therein within said recess; a plunger slidable in the bore of said hollow boss engaging in said recess to retain said cap on said post and having a key on the end thereof engageable in said key slot; said plunger also having an aperture extending transversely therethrough adjacent the end thereof opposite said key and a substantially concentric well extending from the adjacent end through said transverse aperture; a pin having a transverse aperture therein inserted in the aperture in said plunger; a second pin having a shank portion disposed in said well and passing through the aperture in said first mentioned pin, and a flat head portion overlying the adjacent end of said plunger; a screw plug in the open end of said boss; a compression spring between said screw plug and the head of said second pin operative to maintain said parts in assembled relationship; a cam on said bracket immediately below said boss and a roller on the downwardly projecting end of said first-mentioned pin contacting said cam to move said plunger to release said post from said cap whenever the rotation of the post relative to the bracket exceeds a predetermined angular distance.

11. In a tail wheel assembly, a resiliently mounted bracket; a steering post journalled in said bracket for rotation relative thereto and projecting therefrom at its ends; a steering cap having a hollow boss at one side thereof and a pair of steering arms extending laterally therefrom in opposite directions on the upper end of said post; said post having an annular recess within said cap and a portion within said recess operatively engageable with a locking plunger; a plunger slidable in the bore of said boss; a screw plug in the end of said bore and a compression spring between said screw plug and said plunger for maintaining said plunger in engagement with said post within said recess, the inner end of said screw plug being so positioned as to restrain said plunger against accidental movement out of said recess, whereby said cap is maintained on said post unless intentionally removed therefrom.

12. In a tail wheel assembly, a resiliently mounted bracket; a steering post journalled in said bracket and extending beyond said bracket at its ends; a steering wheel secured to the lower end of said post and a steering cap mounted upon the upper end of said post; said post having within said cap an annular recess and a flattened portion within said recess; a hollow boss at one side of said cap and a pair of steering arms extending laterally in opposite directions from said cap; a plunger slidable in the bore of said hollow boss; a compression spring acting against said plunger to maintain said cap and post against relative rotation until the force tending to turn said post relative to said cap exceeds a predetermined value, and manually actuated means connected with said plunger operative to lock said cap to said post against relative movement to permit relative movement between said post and said cap in response to turning forces exceeding said predetermined value and to withdraw said plunger a sufficient amount to provide relative rotation between said post and said cap.

13. In a tail wheel assembly including a steering post and a steering cap mounted on the upper end of said post for rotation relative thereto under predetermined conditions; said post having an annular recess therein within said cap and a flattened portion within said recess and said cap having an elongated hollow boss at one side thereof; a plunger slidable in said boss and engageable at one end with the flattened portion of said post to resist relative rotation between said cap and said post; a compression spring in said boss urging said plunger against said post and a screw plug in said post providing an abutment for said spring; a pin secured at one end to said plunger and projecting upwardly through said boss; a clamp plate pivoted on said boss and receiving the upper end of said pin in a cam slot provided therein and a Bowden cable extending from the operator's compartment of an aircraft to which said tail wheel is applied, operatively connected with said cam plate; said cam slot having a shape such that in one operative position of said plate the plunger is held positively against the steering post to eliminate relative movement between the steering post and the steering cap; in another operative position the plunger is held against said post only by said compression spring and in a third operative position the plunger is withdrawn from contact with the flattened portion of the steering post to provide free relative rotation between the post and the steering cap, the plunger being at all times maintained in said annular recess to prevent accidental separation of said cap from said post.

14. In a tail wheel assembly including a steering post and a steering bracket on the upper end of said post; said post having an annular recess within said bracket and a flattened portion within said recess, and said cap having a hollow boss at one side thereof; a hollow plunger slidable in said boss having a closed end engageable with said post; a compression spring in said plunger; a shaft extending through and journalled in the outer end portion of said boss; a cam on said shaft within said boss; an abutment pin between said cam and said spring having an enlarged head portion between said cam and said plunger; an arm on said shaft for turning said cam and means connected with said lever for manual operation thereof; said cam having different operative positions in one of which the head of the abutment pin is forced against the adjacent end of the plunger to hold the plunger firmly in engagement with the post to prevent relative rotation of the post and the steering cap, in another the abutment pin is held against the spring only so that the plunger is held against the steering post by spring pressure and may rotate relative to the cap under the influence of force exceeding a predetermined magnitude and in still another the spring pressure is relieved to an extent that the post may turn freely in the cap but the plunger is maintained in the annular recess to prevent accidental separation of the cap from the boss.

15. In a tail wheel assembly including a steering post and a steering cap on the upper end of the post; said post having within said cap an annular recess and a flattened portion within said recess and said cap having a hollow boss at one side thereof; a plunger slidable in said boss; a screw plug in the open end of said boss and a compression spring between said screw plug and said plunger operative to resiliently force said plunger against said steering post manually operable means carried by said cap and operatively associated with said plunger to move said plunger against said spring an amount sufficient to permit free rotation of said post relative to said cap.

16. The assembly defined in claim 15 wherein said manually operable means comprises a shaft journalled in said cap and extending transversely across said plunger; a tooth pinion on said shaft meshing with rack teeth on said plunger; an arm rotatable on said shaft and a lug fixed on said shaft and having a portion overlying one side of said arm whereby movement of said arm in one direction will move said plunger but movement of the plunger in the same direction will not move the arm.

17. A tail wheel assembly as defined in claim 15 wherein said screw plug may be threaded into said boss to engagement with the adjacent end of said plunger to maintain said plunger firmly in contact with said post to thereby eliminate relative rotation between said cap and said post.

18. In a tail wheel assembly including a steering post and a steering cap on the upper end of the post said post having an annular recess within said cap and a flattened portion within said recess and said cap having a hollow boss on one side thereof; a plunger slidable in said boss and extending into the recess in said post; a screw in the other end of and a compression spring between said screw plug and said plunger to resiliently urge said plunger against said post; said screw plug being normally positioned to prevent disengagement of said plunger from said recess to thereby prevent accidental displacement of the cap from said post and being adjustable to abut the adjacent end of said plunger to hold said cap against rotation relative to said post and removable from said boss to permit withdrawal of said plunger and removal of the cap from the post.

19. In a tail wheel assembly including a steering post and a steering cap on the upper end of the post said post having an annular recess therein within said cap and a flattened portion within said recess and said cap having a hollow boss at one side thereof; a plunger slidable in said boss; a shaft extending transversely of said plunger journalled in said boss; a pinion on said shaft having teeth meshing with rack teeth on one side of said plunger; an arm on the upper end of said shaft extending over the top of said cap and a pair of spaced screw receptacles in the upper portion of said cap whereby said arm may be secured in either one of two operative positions, in one of which the plunger is held firmly against the post to prevent relative rotation of the cap and post and in the other of which the plunger is withdrawn sufficiently to permit free relative rotation between the steering cap and the steering post.

20. In a tail wheel assembly, a resiliently supported bracket having a portion receiving a steering post; a steering post journalled in said bracket and projecting therefrom at each end; an arm secured at one end on the lower end of the post and secured at its opposite end to a wheel axle; a wheel journalled on said axle and means for restraining said arm against swivelling movement relative to said bracket comprising a flange on said arm immediately below said bracket having an aperture therein which registers with a well in said bracket when the wheel is in alignment with the longitudinal center line of the bracket; a plunger in said well movable between a position in which it engages the aperture in said flange to hold the wheel against swivelling movement and a position in which it is free of said flange to permit swivelling movement of the wheel relative to the bracket and manually controlled means including a rack and pinion for moving the plunger from one end to the other of its two operative positions.

21. In a tail wheel assembly a steering post, an axle and a wheel carrying arm secured at one end to said post and at the opposite end to said axle; the connection between said post and said arm comprising a split collar on said arm, a clamping bolt extending through said collar and through a groove in the side of said post and a key and slot connection between said arm and said post whereby said arm is securely fastened to said post against both longitudinal and rotational movement; the connection between said arm and said axle comprising a split collar on said arm and a clamp bolt extending through said collar and through a groove in the side of said axle whereby said axle is secured to said arm against longitudinal and rotational movements, the rotational force between the axle and the arm being insufficient to require a key and slot connection.

CLAUDE H. NICKELL.

REFERENCES CITED

The following references are of record in the file of this patent:

UNITED STATES PATENTS

| Number | Name | Date |
|---|---|---|
| 1,716,311 | Harris | June 4, 1929 |
| 1,896,234 | Hathorn | Feb. 7, 1933 |
| 2,007,444 | Gannett | July 9, 1935 |
| 2,294,850 | Ostrander | Sept. 1, 1942 |
| 2,312,553 | Hudson | Mar. 2, 1943 |
| 2,329,823 | Camburn | Sept. 21, 1943 |
| 2,338,572 | Corwin | Jan. 4, 1944 |
| 2,344,157 | Maule | Mar. 14, 1944 |
| 2,367,649 | Noorduyne | Jan. 16, 1945 |